(12) United States Patent
Basanets et al.

(10) Patent No.: US 11,151,491 B2
(45) Date of Patent: Oct. 19, 2021

(54) TURN TIME ANALYTICS

(71) Applicant: THE BOEING COMPANY, Chicago, IL (US)

(72) Inventors: Oleksandr Basanets, Montreal (CA); Michael J. Woicekowski, Montreal (CA)

(73) Assignee: THE BOEING COMPANY, Chicago, IL (US)

( * ) Notice: Subject to any disclaimer, the term of this patent is extended or adjusted under 35 U.S.C. 154(b) by 1108 days.

(21) Appl. No.: 15/458,749

(22) Filed: Mar. 14, 2017

(65) Prior Publication Data

US 2018/0268335 A1 Sep. 20, 2018

(51) Int. Cl.
 *G06Q 10/06* (2012.01)
 *B64F 5/40* (2017.01)
(52) U.S. Cl.
 CPC .......... *G06Q 10/06312* (2013.01); *B64F 5/40* (2017.01)
(58) Field of Classification Search
 None
 See application file for complete search history.

(56) References Cited

U.S. PATENT DOCUMENTS

| 6,687,414 | B1 * | 2/2004 | Edgar | G06T 5/007 |
| | | | | 345/611 |
| 2006/0013466 | A1 * | 1/2006 | Xi | G06T 7/73 |
| | | | | 382/133 |
| 2009/0251570 | A1 * | 10/2009 | Shi | G06T 5/002 |
| | | | | 348/241 |
| 2009/0287744 | A1 * | 11/2009 | Bernardini | G06F 11/3447 |
| 2010/0185426 | A1 * | 7/2010 | Ganesan | G08G 5/065 |
| | | | | 703/6 |
| 2012/0296689 | A1 * | 11/2012 | Wewalaarachchi | G06Q 10/06 |
| | | | | 705/7.26 |
| 2014/0320501 | A1 * | 10/2014 | Wessman | G06F 17/18 |
| | | | | 345/440.1 |

(Continued)

OTHER PUBLICATIONS

Barducci et al. "Assessing Noise Amplitude in Remotely Sensed Images Using Bit-Plane and Scatterplot Approaches." IEEE Transactions on Geoscience and Remote Sensing, vol. 45, No. 8, Aug. 2007. (Year: 2007).*

(Continued)

*Primary Examiner* — Susanna M. Diaz
(74) *Attorney, Agent, or Firm* — Patterson + Sheridan, LLP

(57) ABSTRACT

Methods, apparatuses, and computer program products are provided for automatically identifying a shortest duration of time for an aspect of an operation. Electronic data related to instances of past operations of at least one vehicle is received. The data comprises respective available durations of time and actual durations of time for an aspect of the past operations. A candidate data set is generated by removing data related to past operations identified as isolated instances of available durations of time and actual durations of time. A mathematical function is generated that fits the candidate data set. An instance from the candidate data set with the shortest actual duration of time that is less than a threshold distance from the mathematical function is identified. The actual duration of time for the identified instance is assigned as a future duration of time for future operations of the at least one vehicle.

17 Claims, 9 Drawing Sheets

(56) References Cited

U.S. PATENT DOCUMENTS

| | | | |
|---|---|---|---|
| 2016/0253788 A1* | 9/2016 | Lee | G06T 5/20 |
| | | | 382/262 |
| 2016/0378642 A1* | 12/2016 | Adams | G06F 3/04842 |
| | | | 717/125 |
| 2017/0011637 A1 | 1/2017 | Woicekowski et al. | |
| 2017/0011638 A1* | 1/2017 | Agrawal | G06Q 10/06312 |
| 2018/0234568 A1* | 8/2018 | Das | G01N 21/89 |

OTHER PUBLICATIONS

"Cross Validated" web site—answer to "what does an actual vs fitted graph tell US?" Retrieved from [URL: https://stats.stackexchange.com/questions/104622/what-does-an-actual-vs-fitted-graph-tell-US] on Jun. 22, 2020. Published Jun. 24, 2014. (Year: 2014).*

Simaiakis et al."A Queuing Model of the Airport Departure Process."Published 2016.Mathematics, Computer Science Transportation Science.From [URL: https://www.semanticscholar.org/paper/A-Queuing-Model-of-the-Airport-Departure-Process-Simaiakis-Balakrishnan/1ebc8b07af3db2acc33e90b99309d89] on Jun. 25, 2020. (Year: 2016).*

Eswar Sivaraman: "Station-Specific Aircraft Turn Times and Applications for Schedule Reliability", AGIFORS 2007, Denver, CO, May 23, 2007.

* cited by examiner

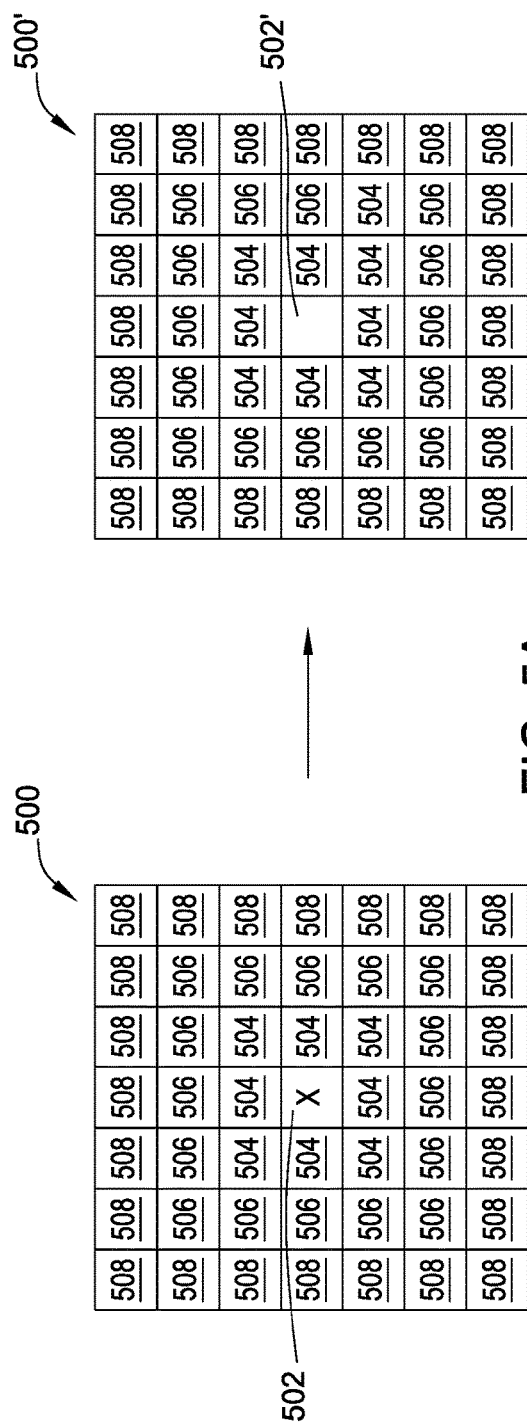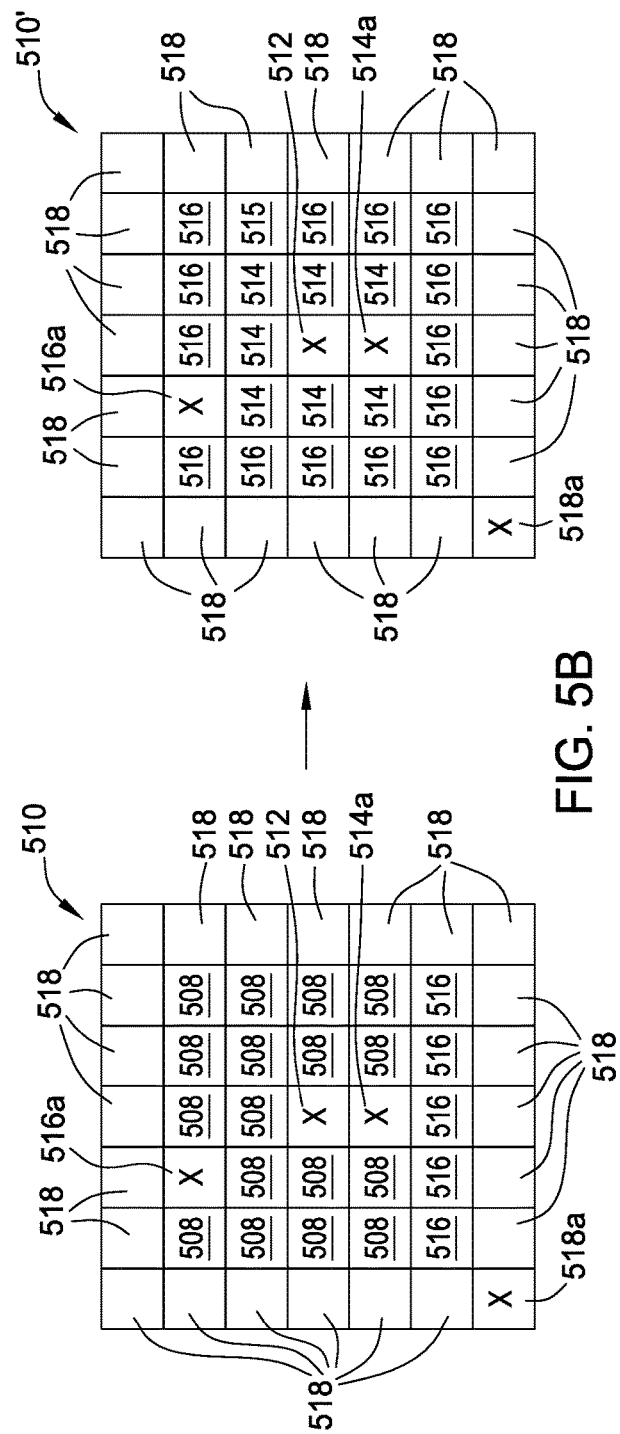
FIG. 5A
FIG. 5B

TURN TIME ANALYTICS

BACKGROUND

Aspects described herein relate to scheduling operations, and more specifically, to determining realistic durations of time for particular aspects of operations.

In the context of commercial vehicles, such as aircraft, trains, trucks, and ships, the vehicles make occasional stops to load and unload cargo and/or passengers, refuel, or otherwise resupply. In many instances, vehicle operators want to minimize the amount of time the vehicles are stopped (i.e., the turn time) because the vehicles generate revenue when carrying passengers and/or cargo to their destinations.

SUMMARY

According to one aspect of the present invention, a computer-implemented method comprises receiving electronic data related to instances of past operations of at least one vehicle. The data comprises respective available durations of time and actual durations of time for an aspect of the past operations. The computer-implemented method also comprises generating a candidate data set by removing from the received electronic data, using a computer processor, data related to past operations identified as isolated instances of available durations of time and actual durations of time. The computer-implemented method also comprises generating, using the computer processor, a mathematical function that fits the candidate data set. The computer-implemented method also comprises identifying, using the computer processor, an instance from the candidate data set with the shortest actual duration of time that is less than a threshold distance from a line defined by the mathematical function. The computer-implemented method also comprises assigning the actual duration of time for the identified instance as a future duration of time for future operations of the at least one vehicle.

According to one aspect of the present invention, a system comprises a computer processor and a computer memory in communication with the computer processor. The computer memory stores electronic data related to instances of past operations of at least one vehicle, wherein the data comprises respective available durations of time and actual durations of time for an aspect of the past operations. The computer memory also stores an application. The application is executable on the computer processor to generate a candidate data set by removing from the electronic data related to past operations identified as isolated instances of available durations of time and actual durations of time. The application is further executable to generate a mathematical function that fits the candidate data set. The application is further executable to identify an instance from the candidate data set with the shortest actual duration of time that is less than a threshold distance from a line defined by the mathematical function. The application is further executable to assign the actual duration of time for the identified instance as an available duration of time for future operations of the at least one vehicle.

According to one aspect of the present invention, a computer program product for calculating a duration of time is provided. The computer program product comprises a computer-readable medium having program instructions embodied therewith. The program instructions executable by a processor to perform an operation comprising receiving electronic data related to instances of past operations of at least one vehicle, wherein the data comprises respective available durations of time and actual durations of time for an aspect of the past operations. The operation further comprises generating a candidate data set by removing from the received electronic data, using a computer processor, data related to past operations identified as isolated instances of available durations of time and actual durations of time. The operation further comprises generating, using the computer processor, a mathematical function that fits the candidate data set. The operation further comprises identifying, using the computer processor, an instance from the candidate data set with the shortest actual duration of time that is less than a threshold distance from a line defined by the mathematical function. The operation further comprises assigning the actual duration of time for the identified instance as a future duration of time for future operations of the at least one vehicle.

BRIEF DESCRIPTION OF ILLUSTRATIONS

FIG. 5A illustrates the removal of pixel information from an image using a 7×7 matrix image noise reduction algorithm;

FIG. 5B illustrates the retention of pixel information from an image using a 7×7 matrix image noise reduction algorithm;

Figure 8A:
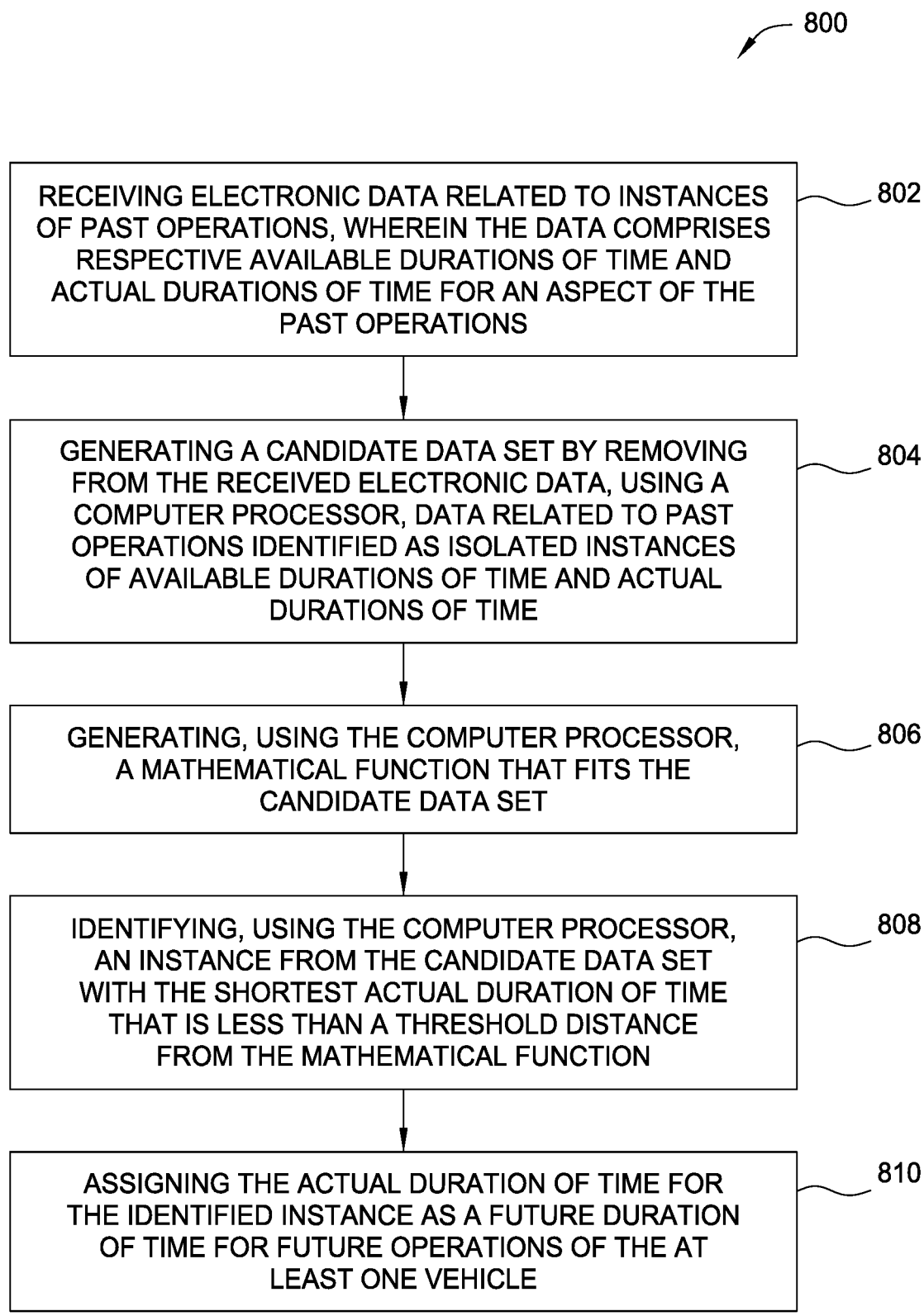
Figure 8B:
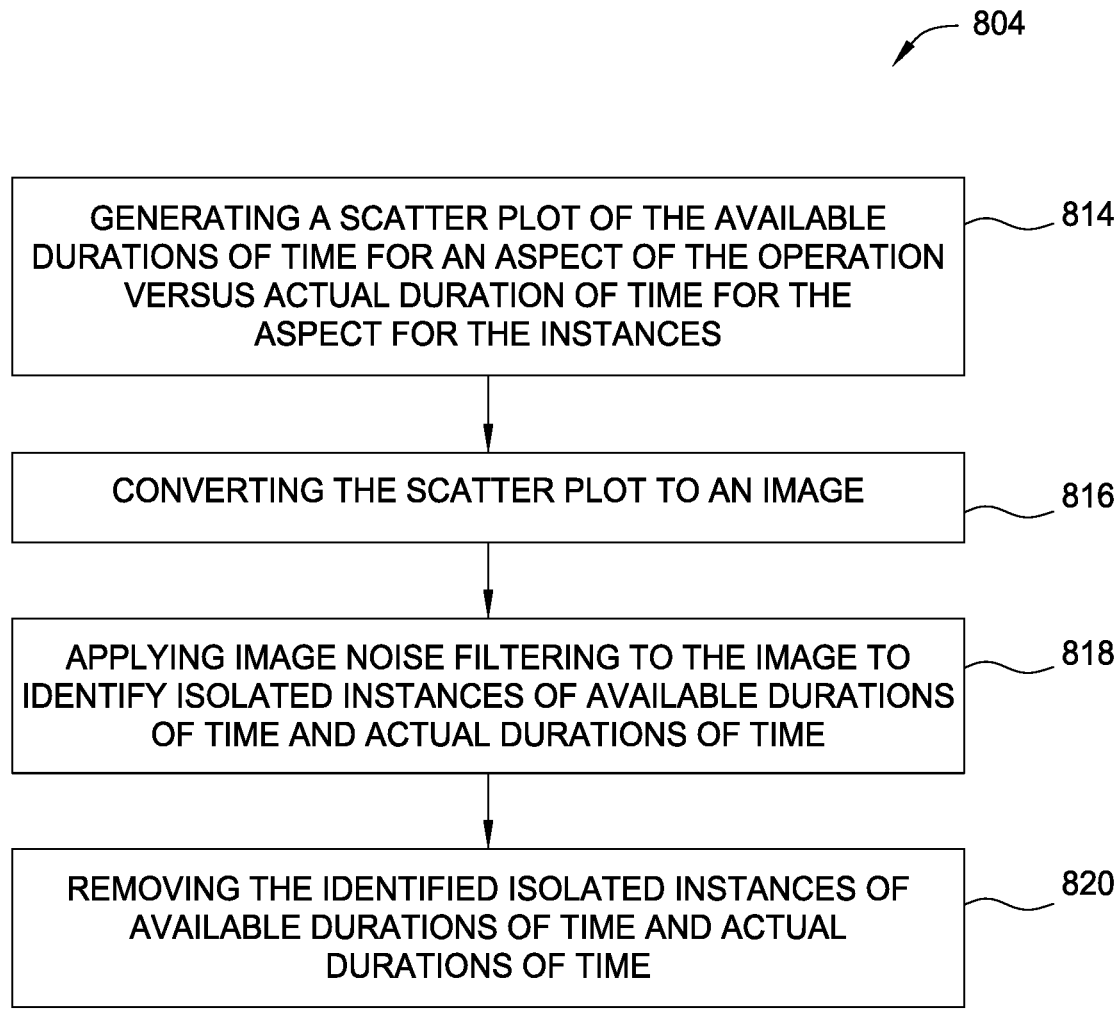

FIG. 8A is a flowchart illustrating a method, according to at least one aspect, for determining realistic durations of time for a vehicle to resume service after an available stop; and FIG. 8B is a flow chart illustrating a method, according to at least one aspect, for generating a candidate data set by removing data related to past operations identified as isolated instances of available durations of time and actual durations of time.

DETAILED DESCRIPTION

Aspects of the present invention are described below with reference to flowchart illustrations and/or block diagrams of methods, apparatus (systems) and computer program products according to aspects of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

To facilitate scheduling of commercial vehicles, such as aircraft, buses, trains, trucks, and ships, vehicle operators include turn times in the schedules to account for when the vehicles are stationary. For example, with respect to commercial aircraft, the turn time is the duration of time between the moment when the aircraft stops at a gate to the moment when the aircraft is pushed back from the gate. Airlines include available turn times for vehicles between flights when planning the schedules for their aircraft. In many instances, it is advantageous for the turn time to be minimized so that the vehicle can be operating and generating revenue for as much of the day as possible. However, scheduling too short of a turn time may be problematic because the vehicle may not be able to follow the planned schedule.

During the time the aircraft is at the gate, the aircraft is refueled, arriving passengers get off the airplane, new passengers board the airplane, arriving cargo and baggage is removed, departing cargo and baggage is loaded, the cabin is cleaned, and cabin supplies (e.g., drinks, snacks, and/or meals) are stocked, for example. These various activities take time, and the amounts of time it takes can vary based on the type of aircraft, the airport, the time of year, and the time of day. For example, a relatively large aircraft, such as a Boeing 777, may have a longer turn time than a relatively small aircraft, such as a Boeing 737, because the Boeing 777 carries more passengers, cargo, fuel, and food. The loading and unloading of these additional passengers, cargo, fuel, and food takes more time for the larger aircraft. As another example, different turn times may be possible at different airports due to congestion, number of available ground crew, and refueling facilities, for example. As yet another example, the various activities may proceed at a slower pace in colder weather, hotter weather, or at night, for example.

In aspects described herein, turn time data is analyzed to automatically identify shortest realistic turn times for different vehicles at different locations. The identified shortest realistic turn times can then be automatically used to plan future vehicle operations. In the context of commercial aircraft, turn time data can be separated into data for different aircraft types and for particular airports. The data is processed to remove isolated instances of turn times that generally do not fit with the remaining data. For example, in certain circumstances, an aircraft may have an unusually long turn time due to a maintenance issue. Such a long turn time would be considered an isolated instance. As discussed below, isolated instances can be identified using noise reduction algorithms. After the isolated instances of turn times are removed, the remaining data is a candidate data set. A statistical analysis, such as linear regression analysis, is performed on the candidate data set to identify a mathematical function that fits the candidate data set. A turn time with the shortest actual turn time that is also within a threshold distance from the mathematical function is then identified as the shortest realistic turn time for that particular vehicle, at the particular location, and at the particular time of day and/or time of year. Future vehicle operations can be scheduled and operated based on the shortest realistic turn time.

Figure 1:
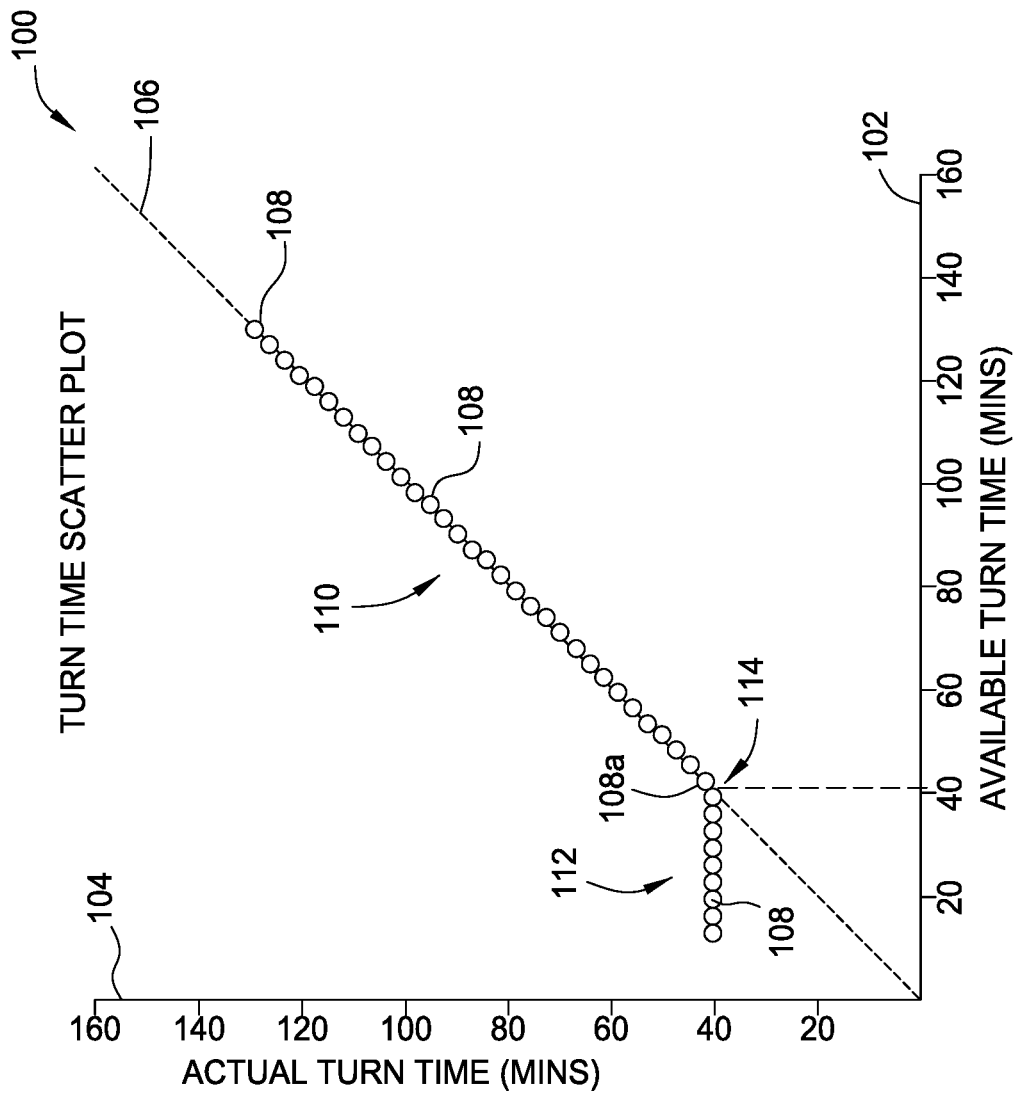
FIG. 1 is a scatterplot of available turn time versus actual turn time under ideal circumstances.

FIG. 1 is scatterplot 100 with available turn times on the horizontal axis 102 and actual turn times on the vertical axis 104 of the scatterplot 100. The available turn time is the amount of time between when the vehicle actually arrives (e.g., when an aircraft arrives at the gate) to when the vehicle is scheduled to depart (e.g., when the aircraft is scheduled to depart from the gate). For reference, the scatterplot 100 includes a line of symmetry 106 (illustrated in broken line), indicating locations on the scatterplot 100 where the available turn time and the actual turn time are the same. The scatterplot 100 of FIG. 1 illustrates fictional instances of past operations 108 under ideal circumstances (i.e., with no variations in operations) to illustrate general principles of identifying a shortest turn time for a vehicle. Under these ideal circumstances, for available turn times greater than about forty minutes, the actual turn times of the instances of past operations 108 match the available turn times because, generally, the vehicle does not depart ahead of schedule. For example, for a commercial aircraft that is available to depart from a gate at a particular time, the aircraft will not leave the gate early even if it is ready to depart at an earlier time. Also under the ideal circumstances depicted in FIG. 1, for available turn times less than about forty minutes, the actual turn times of the instances of past operations 108 remain at forty minutes, regardless of the available turn time. This departure from the actual turn times at forty minutes indicates that the tasks that need to be performed while the vehicle is parked at the gate cannot be performed in less than forty minutes. Based on the above, the instances of past operations 108 fall into two groups: a first group 110 in which the actual turn times and available turn times match, and a second group 112 in which the actual turn times diverge from and are longer than the available turn times. The first group 110 and the second group 112 intersect at a point 114 corresponding to the instance of past operations 108a with the shortest actual turn time matching the available turn time (i.e., where the instance of past operations 108a still lies on the line of symmetry 106). By identifying the shortest actual time matching the available time on this scatterplot 100 based on ideal circumstances, the shortest realistic turn time of approximately forty minutes can be identified.

Figure 2:
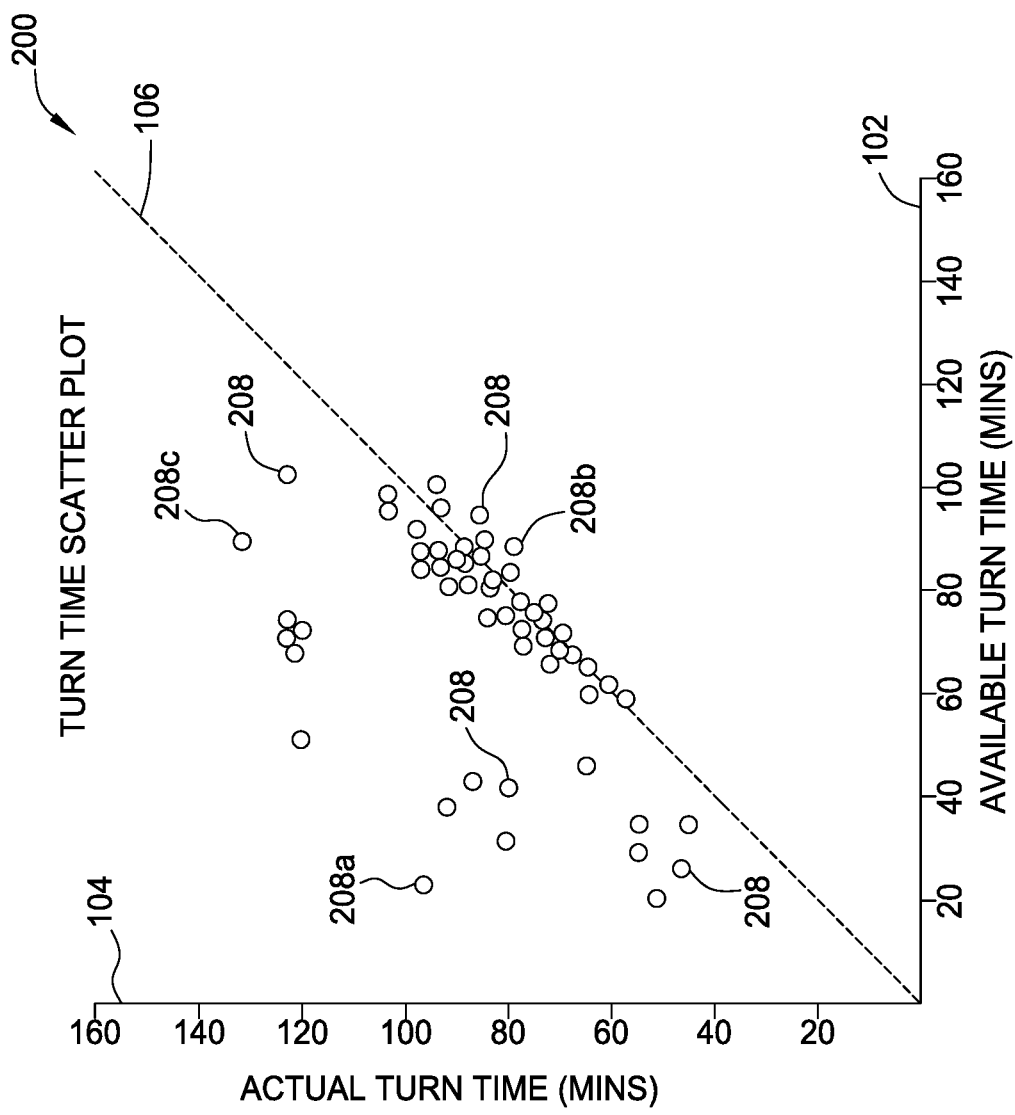
FIG. 2 is a scatterplot of available turn time versus actual turn time under exemplary realistic circumstances.

In the real world, the instances of past operations will not map onto a scatterplot as neatly as shown in FIG. 1 due to variations and/or aberrations in operations. FIG. 2 illustrates a scatterplot 200 with instances of past operations 208 based on more-realistic vehicle operations. In aspects in which the vehicle is a commercial aircraft, the scatterplot 200 may pertain to a particular aircraft model at a particular airport. For clarity, the scatterplot 200 includes a relatively small number of instances of past operations 208. In various aspects, scatterplots could include hundreds or thousands of instances of past operations 208. Additionally, in at least one aspect, the data does not include instances of operations in which there is a crew change (i.e., when the same crew follows the aircraft). In the event a crew has to transfer from one aircraft to another aircraft, that transfer may add additional delays that are unrelated to the aircraft and the particular airport. For example, a crew may have to take a bus or tram to get from a first aircraft to a second aircraft. The crew may be delayed if they just miss a bus and have to wait for the next bus, for example. Therefore, the data omits instances of past operations in which the crew is transferring from another aircraft. In at least one aspect, data for an instance of a past operation with a crew change may not be omitted if the subsequent operation is a first operation for the incoming crew. For example, if a flight crew is meeting an arriving aircraft for their first flight of the day, it is unlikely that the flight crew will be delayed in a manner that would skew the data related to the turn time for the aircraft at the airport.

In the event that data related to instances of past operations with crew change is to be omitted, such data can be identified based on historical data related to the paths of the vehicles and the paths for the crews. For example, with reference to commercial aircraft, airlines typically maintain computer records that include the legs flown by particular aircraft and the legs flown by particular crews. In the event the legs for an aircraft and the legs for a crew for a particular schedule interval (e.g., a day) do not match, then a crew change took place. For example, consider a scenario in which an aircraft flies from Boston to Chicago to Denver and an aircraft crew also flies from Boston to Chicago to Denver. In such a scenario, the legs for the aircraft and crew match, so there is no crew change. In contrast, consider another scenario in which an aircraft flies from Orlando to Houston to Seattle, but the crew flies from Orlando to Houston to Charlotte, then there was a crew change. Such analysis of crew and aircraft data to identify mismatches can be performed using a computer processor, and the data associated with such mismatches (and crew changes) can be flagged for omission.

The scatterplot 200 includes many instances of past operations 208 arranged close to the line of symmetry 106 but also a significant number of instances of past operations 208 that deviate from the line of symmetry 106. Various instances of past operations 208 may deviate from the line of symmetry 106 for a number of reasons. For example, instances 208a and 208c lie significantly above the line of symmetry 106, such that the actual turn time was significantly greater than the available turn time. Instances of past operations 208a and 208c may correspond to instances of past operations 208 when the vehicle underwent an unscheduled repair, for example. As another example, instance 208b lies significantly below the line of symmetry 106, such that the actual turn time was less than the available turn time. Instance 208b may correspond to an instance of past operations 208 when the vehicle arrived late but was able to depart on time such that the actual stopped time for the vehicle (i.e., the actual turn time) was less than the available stopped time for the vehicle (i.e., the available turn time). In other circumstances, instances of past operations 208 may deviate from the line of symmetry 106 or from otherwise achievable turn times due to other random factors, such as an unusually large cargo load, passengers who require extra time to board or exit the vehicle, or a delay in refueling the vehicle. In other circumstances, instances of past operations 208 may deviate from the line of symmetry 106 or from otherwise achievable turn times due to delay propagation effects wherein a current instance of operations is delayed due to delays to earlier operations of the same vehicle that have propagated to the current operation.

The variations of the instances of past operations 208 on the scatterplot 200 (compared to the scatterplot 100 in FIG. 1) make it difficult to identify a shortest achievable actual turn time. In the aspects described herein, isolated instances of past operations 208 (e.g., instances associated with an unscheduled maintenance issue) are automatically removed. After such isolated instances of past operations 208 are removed, the remaining instances of past operations 208, which form a candidate data set, are statistically analyzed to identify a mathematical fit through the data. The instance of past operations 208 in the candidate data set with the shortest actual turn time and which is within a predetermined distance of the mathematical fit is thereafter identified as the realistic turn time for the vehicle at the location.

Figure 3A:
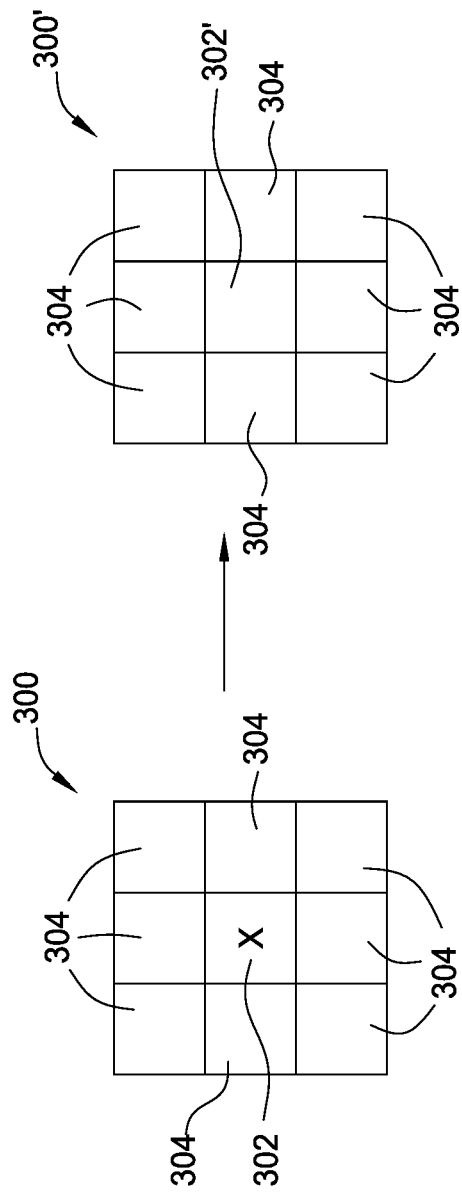
FIG. 3A illustrates the removal of pixel information from an image using a 3×3 matrix image noise reduction algorithm.
Figure 3B:
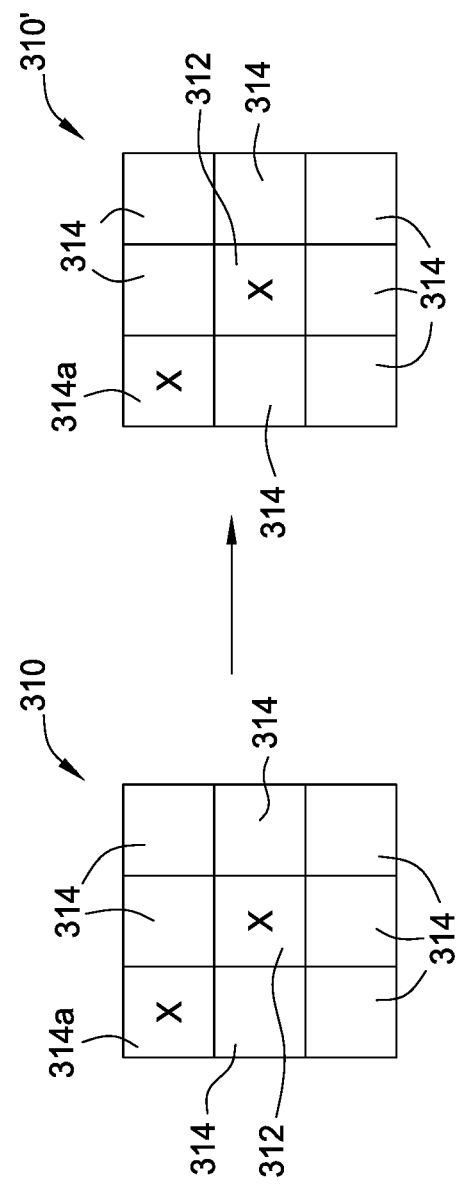
FIG. 3B illustrates the retention of pixel information from an image using a 3×3 matrix image noise reduction algorithm.

In one aspect, to remove isolated instances of past operations 208, the scatterplot 200 is converted to an image (e.g., converted to a bitmap file, a jpeg file, or a tiff file). In the resulting image file, pixel locations on the image correspond to coordinates of the scatterplot. For example, the pixels in the image may be white, generally, and black pixels may be placed in the image at locations corresponding to the instances of past operations 208. After the scatterplot 200 is converted to an image, image noise reduction techniques are applied to the image to remove certain isolated instances of past operations 208. FIGS. 3A, 3B, 4A, 4B, 5A, and 5B illustrate the use of 3×3, 5×5, and 7×7 matrix noise reduction algorithms, respectively, to remove certain isolated instances of past operations 208. FIGS. 3A and 3B illustrate operations of a 3×3 matrix noise reduction algorithm in which a pixel is removed or retained, respectively. FIG. 3A illustrates a three by three matrix of pixels 300 in which a center pixel 302 is black (indicated by the "X"), according to the above-described exemplary scheme, and the eight surrounding pixels 304 are white (indicated by the absence of an "X"). According to the 3×3 matrix noise reduction algorithm, the center pixel 302 is changed from black to white if the eight surrounding pixels 304 are white. Since the eight surrounding pixels 304 are white, the center pixel 302 is changed from black to white. The altered 3×3 matrix of pixels 300' has an altered center pixel 302' that is changed to white.

FIG. 3B illustrates another three by three matrix of pixels 310 in which the center pixel 312 is black, but the eight surrounding pixels 314 includes a surrounding pixel 314a that is also black. In accordance with the 3×3 matrix noise reduction algorithm, the center pixel 312 remains black because the one surrounding pixel 314a is also black. Therefore, the "altered" 3×3 matrix of pixels 310' is identical to the unaltered three by three matrix of pixels 310.

Figure 4A:
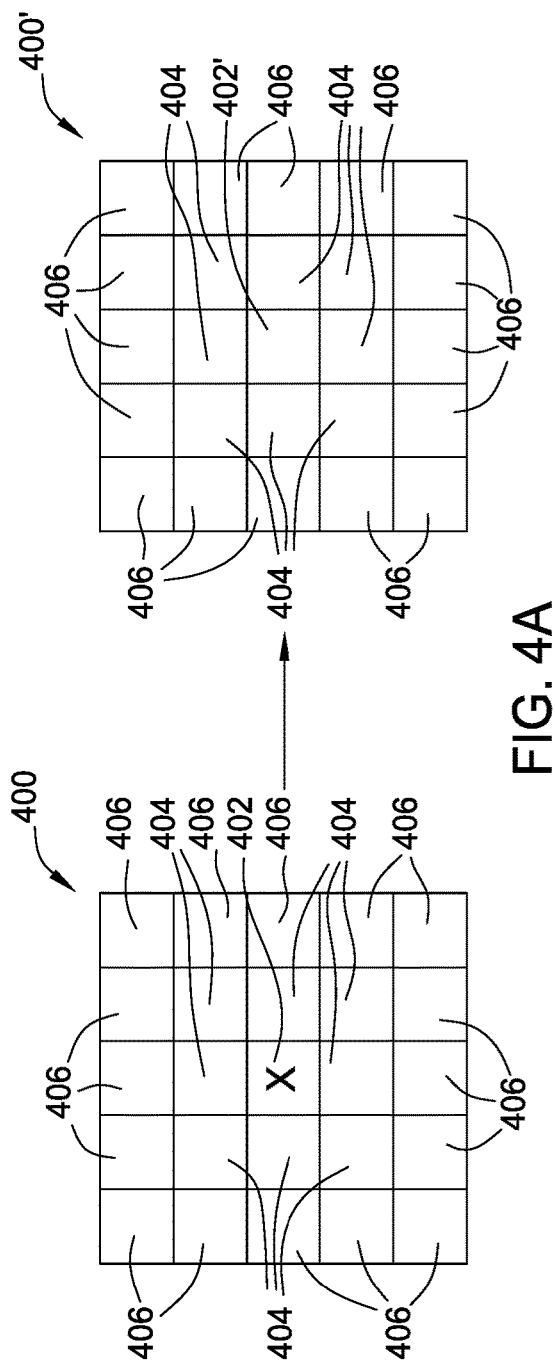
FIG. 4A illustrates the removal of pixel information from an image using a 5×5 matrix image noise reduction algorithm.
Figure 4B:
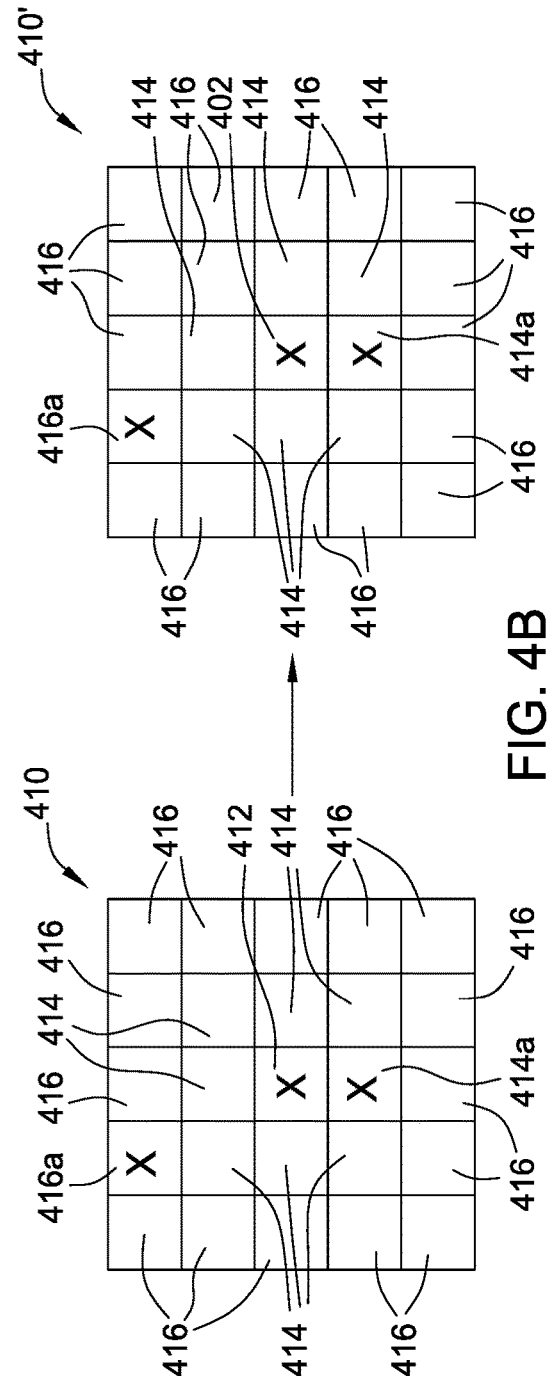
FIG. 4B illustrates the retention of pixel information from an image using a 5×5 matrix image noise reduction algorithm.

FIGS. 4A and 4B illustrate operations of a 5×5 matrix noise reduction algorithm in which a pixel is removed or retained, respectively. FIG. 4A illustrates a four by four matrix of pixels 400 in which the center pixel 402 is black, the eight surrounding pixels 404 are white, and the sixteen pixels 406 surrounding the eight surrounding pixels 404 are also white. According to the 5×5 matrix noise reduction algorithm, the center pixel 402 is changed from black to white if the eight surrounding pixels 404 and the sixteen pixels 406 surrounding the eight surrounding pixels 404 are white. Since the eight surrounding pixels 404 are white and the sixteen pixels 406 surrounding the eight surrounding pixels 404 are white, the center pixel 402 is changed from black to white. The altered 5×5 matrix of pixels 400' has an altered center pixel 402' that is changed to white.

FIG. 4B illustrates another 5×5 matrix of pixels 410 in which the center pixel 412 is black, one pixel 414a of the eight surrounding pixels 414 is black, and one pixel 416a of the sixteen pixels surrounding the eight surrounding pixels 414 is black. In accordance with the 5×5 matrix noise reduction algorithm, the center pixel 412 remains black because the pixel 414a and the pixel 416a are black. Note that the center pixel 412 would also remain black if only the pixel 414a was also black (and the pixel 416a was white). Additionally, the center pixel 412 would remain black if only the pixel 416a was also black (and of the pixel 4141a was white). Therefore, the "altered" 5×5 matrix of pixels 410' is identical to the unaltered 5×5 matrix of pixels 410.

FIGS. 5A and 5B illustrate operations of a 7×7 matrix noise reduction algorithm in which a pixel is removed or retained, respectively. FIG. 5A illustrates a 7×7 matrix of pixels 500 in which the center pixel 502 is black, the eight surrounding pixels 504 are white, the sixteen pixels 506 surrounding the eight surrounding pixels 504 are also white, and the twenty-four pixels 508 surrounding the sixteen pixels 506 are also white. According to the 7×7 matrix noise reduction algorithm, the center pixel 502 is changed from black to white if the surrounding pixels 504, 506, and 508 are all white. Since the surrounding pixels 504, 506, and 508 are all white, the center pixel 502 is change from black to white. The altered 7×7 matrix of pixels 500' has an altered center pixel 502' that is changed to white.

FIG. 5B illustrates another five by five matrix of pixels 510 in which the center pixel 512 is black, one pixel 514a of the eight surrounding pixels 514 is black, one pixel 516a of the sixteen pixels surrounding the eight surrounding pixels 514 is black, and one pixel 518a of the twenty-four pixels 518 surrounding the sixteen pixels 516 is black. According to the 7×7 matrix noise reduction algorithm, the center pixel 512 remains black because the pixels 514a, 516a, and 518a are black. Note that the center pixel 512 would also remain black if only the pixel 514a was also black (in the pixels 516a and 518a were white). Additionally, the center pixel 512 remain black if only the pixel 516a was also black (in the pixels 514a and 518a were white). Also, the center pixel 512 remain black if only the pixel 518a was also black (in the pixels 514a and 516a were white). Therefore, the "altered" 7×7 matrix of pixels 510' is identical to the unaltered 7×7 matrix of pixels 510.

Figure 6:
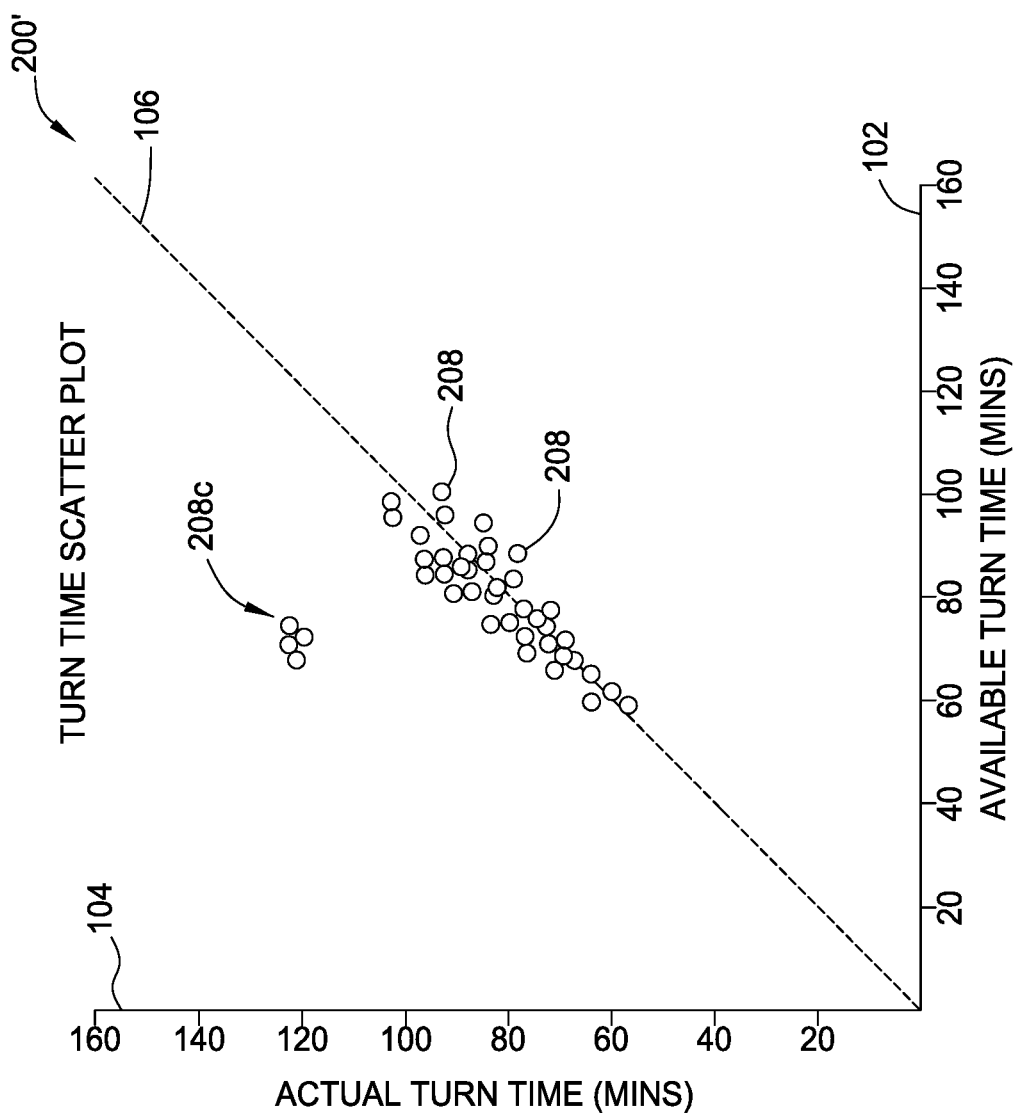
FIG. 6 is a scatterplot of available turn time versus actual turn time under the exemplary realistic circumstances illustrated in FIG. 2, wherein certain pixel information relating to particular isolated instances of available turn time versus actual turn time have been removed using a noise reduction algorithm.

By applying one or more of the 3×3, 5×5, or 7×7 matrix noise reduction algorithms (or other image noise reduction algorithms), certain pixels that correspond to isolated instances of past operations 208 may be removed from the image of the scatterplot. FIG. 6 illustrates a modified scatterplot 200' after one or more of the 3×3, 5×5, or 7×7 matrix noise reduction algorithms (or other image noise reduction algorithms) has been applied to the scatterplot 200 illustrated in FIG. 2. Many of the isolated instances of past operations 208 (e.g., instances of past operations 208 that are not close to other instances of past operations 208) have been removed from the graph. However, the modified scatterplot 200' still includes a cluster of instances of past operations 208c that are significantly isolated from the remainder of instances of past operations 208 proximate to the line of symmetry 106. In the context of commercial aircraft, the cluster of instances of past operations 208c may represent similar abnormal operations, such as a day when a particular piece of ground equipment, such as a tug or fuel truck, was inoperative and affected a number of flights in a similar manner such that the deviations in actual turn time from available turn time were roughly the same, for example.

To remove the cluster of instances of past operations 208c or similarly distant isolated instances of past operations 208, a second noise filtering operation can be performed in which instances of past operations 208 that are more than an isolation distance from the line of symmetry 106 on the image of the scatterplot are removed. The isolation distance is a predetermined distance that may be fixed in certain aspects and may be user selectable in certain other aspects. Generally, the distance "d" from a point (m, n) to a line defined by Ax+By+C=0, wherein the distance is measured in a direction perpendicular to the line (hereinafter, a perpendicular distance), is given by Equation (1):

$$d = \frac{|Am + Bn + C|}{\sqrt{A^2 + B^2}}, \quad (1)$$

wherein "x" and "m" correspond to positions along the horizontal axis 102 of the scatterplot 200, "y" and "n" correspond to positions along the vertical axis 104 of the scatterplot 200, and "A," "B," and "C" are coefficients of the line. For the line of symmetry 106, "x" equals "y" at all locations such that "A" is equal to 1, "B" is equal to −1, and "C" is equal to 0. Therefore, Equation (1) can be simplified to calculate the perpendicular distance from a point (m, n) to the line of symmetry 106 is given by Equation (2):

$$d = \frac{|m - n|}{\sqrt{2}}. \quad (2)$$

As discussed above, an isolation distance can be a predetermined distance, and any instances of past operations 208 that have distances "d" (according to Equation (2)) greater than or equal to the isolation distance are removed from the modified scatterplot 200'.

Figure 7:
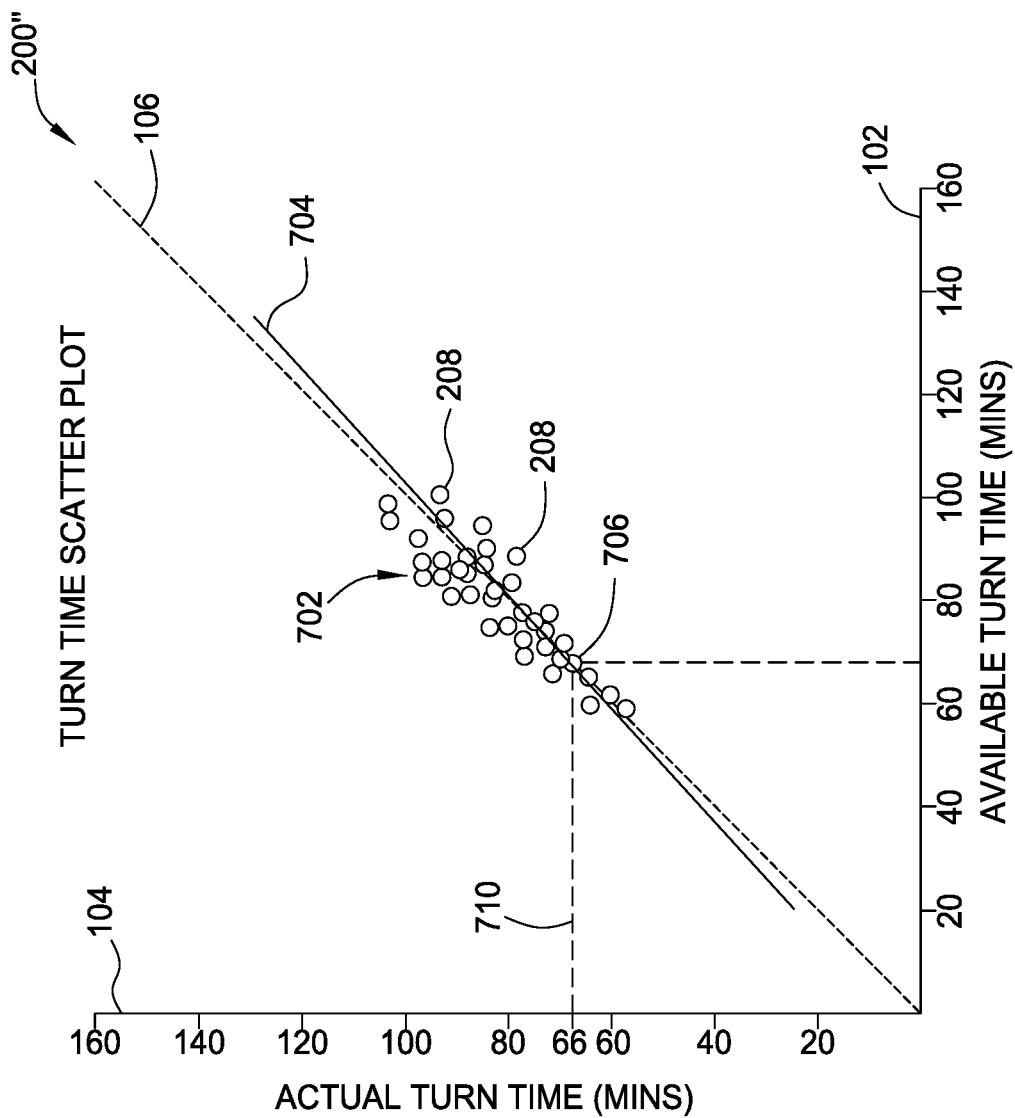
FIG. 7 is the scatterplot of available turn time versus actual turn time under the exemplary realistic circumstances illustrated in FIG. 6, wherein additional certain pixel information relating to additional particular isolated instances of available turn time versus actual turn time have been removed based on a distance from asymmetry line on the image of the scatterplot.

FIG. 7 illustrates the scatterplot 200' after the second noise filtering operation has been performed such that the remaining instances of past operations 208 form a candidate data set 702. Statistical analysis is performed on the candidate data set 702 to fit a linear mathematical function 704 (e.g., a line) through the candidate data set. For example, a linear regression analysis may be performed on the candidate data set. As another example, a Hough transform may be performed on the candidate data set. Such a linear mathematical function will be defined by Ax+By+C=0 and will have coefficients "A," "B," and "C."

After the linear mathematical function 704 is fit to the candidate data set 702, an instance of past operations 208 from the candidate data set 702 with a shortest actual turn time that matches the linear mathematical function 704 is identified. To identify instances of past operations 208 that match the linear mathematical function 704, respective distances of the instances of past operations 208 from the linear mathematical function 704 are calculated according to Equation (1). A particular instance of past operations 208 from the candidate data set 702 is determined to match the linear mathematical function 704 if the calculated distance from the particular instance of past operations 208 to the linear mathematical function 704 is less than a threshold distance. After the instances of past operations 208 from the candidate data set 702 that match the linear mathematical function 704 have been determined, the matching instance of past operations 208 with the shortest actual turn time is identified. In the exemplary data in the scatterplot 200" of FIG. 7, the instance of past operations 208 labeled with the reference numeral 706 is identified as the determined matching instance of past operations 208 with the shortest actual turn time. The identified instance of past operations 706 corresponds with an actual duration of time for the turn time of sixty-six minutes, as shown by broken line 710.

In various aspects, more than one instance of past operations 208 of the candidate data set 702 that match the linear mathematical function 704 may be used to determine a shortest actual turn time. For example, in one aspect, a plurality of instances of past operations that match the linear mathematical function 704 with the shortest actual turn times are identified, and an average of those shortest actual turn times is used. In another aspect, one or more instances of past operations 208 of the candidate data set 702 that match the linear mathematical function 704 may be omitted or ignored. By omitting or averaging one or more instances of past operations 208 from the candidate data set 702 that match the linear mathematical function 704 and that have the shortest actual turn times, a margin can be added to the determined actual turn time.

The actual turn time associated with the identified instance of past operations 706 is assigned as a turn time for scheduling future operations of the vehicle. As discussed above, using the determined actual turn time associated with the identified instance of past operations 706 as a turn time for scheduling future operations can result in more realistic schedules for future vehicle operations. As a result, the vehicle operator may be able to perform additional vehicle operations within a window of time, such as a day, a crew shift, or a vehicle shift.

In the above-described aspects, the aspect of operations is a turn time for commercial aircraft (e.g., for a fleet of aircraft). In various other aspects the aspect of operations could be different and/or the vehicle type could be different. For example, still with reference to commercial aircraft, the aspect of operations could be a maintenance time from when the aircraft arrives for a maintenance service to when it departs following the maintenance service. In another aspect, the vehicle could be a ship (e.g., a cargo ship), and the aspect of operations is a time in port during which cargo is offloaded and/or loaded and the ship is resupplied with food, fuel, etc. In yet another aspect, the vehicle could be a train, and the aspect of operations is a time stopped in a particular train station (i.e., a station stop time). In various aspects, the above described methods could be used in conjunction with other activities besides vehicle operations. For example, hospitals and other medical facilities could use the above described methods to determine time durations for certain surgical procedures or time durations for certain events, such as cleaning and preparing an operating room between surgeries.

FIG. 8A is a flow chart for a method 800 for automatically identifying a shortest duration of time for as aspect of an operation according to at least one aspect. In block 802 of the method 800, electronic data related the aspect of the operation for instances past operations is received. The data comprises respective available durations of time and actual durations of time for the aspect of the past operations. In at least one aspect, the data does not include instances in which there is a crew change associated with the aspect of operations. With respect to the above-described aspects in which the aspect of operations is turn times for commercial aircraft, the data for actual durations of time for turn times for instances of past operations can be retrieved from OOOI data (which stands for Out of the gate, Off of the ground, On the ground, and In the gate) can provide times at which the aircraft leaves the gate, takes off, lands, and returns to a gate. To determine the actual turn time for a particular aircraft at a particular airport, the "In the gate time" from a first flight is subtracted from the "Out of the gate" time for a second, subsequent flight. To determine the available turn time for the aircraft at the particular airport, the "In the gate time" from the OOOI data for the first flight is subtracted from a scheduled departure time retrieved from scheduling data for the aircraft. In at least one aspect, the actual and available turn times are provided in minutes. In other aspects, the actual and available turn times (or other aspects of past operations) could be provided in hours, seconds, days, or other suitable units of time.

The electronic data may be specific to subgroup of operations. For example, with respect to turn times of commercial aircraft, the electronic data may be related to a particular type of aircraft at a particular airport. For example, the electronic data could be related to Boeing 737's or to Boeing 777's. The electronic data could be further separated into aircraft sub-models. For example, the electronic data could be related to the Boeing 737-700, the Boeing 737-800, or the Boeing 737-900. In addition, the received electronic data could be related to a particular location, date, time of day, weather, or other factors. For example, in the exemplary aspects discussed above with reference to FIGS. 2, 6, and 7, the data could be related to a particular airport or a gate at the airport. Different airports and/or different gates at an airport may have different support equipment that results in different durations of time for aircraft turn time. Additionally, the locations of different gates at the airport may result in different durations of time for aircraft turn time. As another example, the data could be for a particular month, week, or time of year (e.g., summer or winter). Different times of year may present challenges (e.g., high temperatures or snow on the ground) that result in different durations of time for aircraft turn time. As another example, the data could be separated based on particular times of day (e.g., morning, noon, evening, and overnight). Different times of day may result in different durations of time for aircraft turn time (e.g., an airport may not be as busy at 10:00 AM as it is at 8:00 AM, resulting in more ground crew availability to quickly service an aircraft or ground crew may be able to work faster in sunlit conditions than in nighttime conditions).

In block 804 of the method 800, a candidate data set is generated by removing from the received electronic data any data related to past operations identified as isolated instances of available durations of time and actual durations of time for the aspect of operations. In block 806 of the method 800, a mathematical function that fits the candidate data set is generated. As discussed above, the mathematical function may be generated using a linear regression algorithm, a Hough transform, or other statistical methods.

In block 808, an instance from the candidate data set with the shortest actual duration of time that is less than a threshold distance from the mathematical function is identified. Thereafter, in block 810, the actual duration of time associated with the identified instance is assigned as a future duration of time to schedule future operations.

FIG. 8B is a flowchart for performing block 804 of the method 800, in which a candidate data set is generated by removing from received electronic data any data related to past operations identified as isolated instances of available durations of time and actual durations of time. In block 814, a scatterplot of the available durations of time for the aspect of the operation versus actual duration of time for the aspect is generated for the instances of past operations. In block 816, the scatterplot is converted to an image. As discussed above, the image file could be a JPEG file, a bitmap file, a TIFF file, or any other suitable image file. In block 818, image noise filtering is applied to the image to identify isolated instances of available durations of time and actual durations of time. In block 820, the identified isolated instances of available durations of time and actual durations of time are removed.

In various aspects, the isolated instances of available durations of time and actual durations of time for the aspect of vehicle operations may be determined using table operations instead of the above-described image noise reduction techniques. For example, the received data may be entered into a table in which each row of the table corresponds to a particular actual duration of time for the aspect of the operations and each column of the table corresponds to a particular available duration of time for the aspect of the operations. Isolated instances of the durations of time (e.g., instances in the table in which a cell with a non-zero value is surrounded by cells with zero values) could be removed.

After the shortest realistic duration of time for a particular aspect of an operation has been identified, that shortest realistic duration of time can be used to plan future flights. In the context of turn times for commercial airlines, the shortest realistic turn times for various aircraft models at different airports could be automatically provided to a scheduling program that develops future schedules for aircraft. For example, suppose that the shortest realistic turn time for a Boeing 737-800 at Chicago's O'Hare International Airport in March is determined (according to the above-described methods) to be twenty seven minutes. The determined twenty seven minute turn time would be automatically provided to the scheduling software. In turn, the scheduling software would assign a turn time of twenty seven minutes for any Boeing 737-800 aircraft flying into an out of O'Hare International Airport. Stated differently, if the scheduling software is scheduling a particular Boeing 737-800 to arrive at a gate at O'Hare International Airport at 9:00 AM on March 2, then the scheduling software would depart from that same gate at 9:27 AM on March 2. Schedules for other Boeing 737-800 aircraft flying through O'Hare International Airport would be built using the same twenty seven minute turn time. Moreover, similar schedules would be constructed for different aircraft types and/or different airports.

After the scheduling software generates the various aircraft flight schedules for the various aircraft, based on the shortest realistic turn times, dispatchers can dispatch the aircraft to operate according to the schedule. In turn, the aircraft are operated in accordance with the schedules, based on the determined shortest realistic turn times. The above-described methods for calculating shortest realistic turn times can be re-run based on new operations data, which may result in updated shortest realistic turn times. Such updated shortest realistic turn times can be used to generate the next schedule for future operations.

In at least one aspect, the shortest realistic turn times for different aircraft types at different airports are tabulated in a data structure (e.g., in a computer data file named "min turn tim.etab"). The data structure is then used by flight planning software provided by Jeppesen®. The Jeppesen® flight planning software performs three consecutive steps to generate flight plans. In a first "tail assignment" step, the Jeppesen® flight planning software constructs sequential flights for a plurality of aircraft to perform desired flights over a particular time period (e.g., a month). In a second "crew pairing" step, the Jeppesen® flight planning software combines sequential flights into duty periods and then combines the different duty periods into trips that are performable within the limits of an individual crew member or crew pairing. In a third "crew rostering" step, the Jeppesen® flight planning software assigns actual crew members to the trips, based on crew availability, vacations, planned absences, etc.

The Jeppesen® flight planning software uses the data structure including the shortest realistic turn times in the "tail assignments" step. As the software builds a sequence of flights for a particular aircraft, the software performs look up functions on the data structure to identify shortest realistic turn times for the aircraft type and for the different airports the aircraft is expected to fly to. For example, suppose the Jeppesen® flight planning software is constructing a flight schedule for an airline for a particular month and is constructing a sequence of flights for a Boeing 737-800 that is in the fleet of aircraft of a particular airline. If the Jeppesen® flight planning software is constructing a schedule for that aircraft that includes a first stop at O'Hare International Airport, then the software would perform a first look up function on the data structure that outputs the shortest realistic turn time for a Boeing 737-800 at O'Hare International Airport. The Jeppesen® flight planning software would use the output shortest realistic turn time, in combination with a scheduled time to arrive at a gate at O'Hare International Airport, to schedule a time when the Boeing 737-800 will depart from the gate. If the Jeppesen® flight planning software is next planning for that Boeing 737-800 to fly through Denver International Airport, then the software would perform a second look up function on the data structure that outputs the shortest realistic turn time for a Boeing 737-800 at Denver International Airport. The Jeppesen® flight planning software would use the output shortest realistic turn time, in combination with a scheduled time to arrive at a gate at Denver International Airport, to schedule a time when the Boeing 737-800 will depart from the gate.

Continuing the example, suppose the Jeppesen® flight planning software is constructing a sequence of flights for a Boeing 777-300 that is in the fleet of aircraft of the particular airline. If the Jeppesen® flight planning software is constructing a schedule for that aircraft that includes a first stop at San Francisco International Airport, then the software would perform a third look up function on the data structure that outputs the shortest realistic turn time for a Boeing 777-300 at San Francisco International Airport. The Jeppesen® flight planning software would use the output shortest realistic turn time, in combination with a scheduled time to arrive at a gate at San Francisco International Airport, to schedule a time when the Boeing 777-300 will depart from the gate. If the Jeppesen® flight planning software is next planning for that Boeing 777-300 to fly through Narita International Airport in Japan, then the software would perform a fourth look up function on the data structure that outputs the shortest realistic turn time for a Boeing 777-300 at Narita International Airport. The Jeppesen® flight planning software would use the output shortest realistic turn time, in combination with a scheduled time to arrive at a gate at Narita International Airport, to schedule a time when the Boeing 777-300 will depart from the gate.

After constructing the sequential flights for all or most of the available aircraft within a fleet (e.g., a few aircraft may be reserved as spares), the Jeppesen® flight planning software performs the "crew pairing" step. Again, the Jeppesen® flight planning software can use the shortest realistic turn times for the various airports to calculate aspects of the duty periods for the flight crews. For example, for certain aspects of crew planning, an amount of time that an aircraft is parked at the gate between flights may count toward a flight crew's total permissible duty time. After the Jeppesen® flight planning software has performed the "crew pairing" step, the software can perform the "crew rostering" steps to assign flight crews to the various flight operations.

The above-described methods provide an automated method for identifying a shortest realistic duration of time for a particular aspect of an operation such that the identified realistic duration of time can be used to schedule future operations. By using a realistic duration of time to schedule the future operations, the confidence in the schedule can be improved, leading to fewer time buffers being added to the schedule and more instances in which the schedule is followed without deviation.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

As will be appreciated by one skilled in the art, aspects of the present invention may be embodied as a system, method or computer program product. Accordingly, aspects of the present invention may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a turn time determination algorithm) or related data available in the cloud. For example, the turn time determination algorithm could execute on a computing system in the cloud and output a shortest actual turn time for a particular aircraft type at an airport. In such a case, the turn time determination algorithm could calculate the shortest actual turn times for different aircraft types at different airports and store the calculated shortest actual turn times at a storage location in the cloud.

Doing so allows a user to access this information from any computing system attached to a network connected to the cloud (e.g., the Internet).

Aspects described herein may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects of the present invention, other and further aspects of the invention may be devised without departing from the basic scope thereof, and the scope thereof is determined by the claims that follow.

What is claimed is:

1. A computer-implemented method, comprising:
receiving electronic data related to instances of past operations of at least one vehicle, wherein the data comprises respective available durations of time and actual durations of time for an aspect of the past operations;
generating a scatter plot of the available durations of time for an aspect of the vehicle operation versus actual duration of time for the aspect for the instances;
converting the scatter plot to a computer-generated image, using a computer processor, such that locations of a plurality of pixels in the computer-generated image correspond with coordinates in the scatter plot;
identifying isolated instances of available durations of time and actual durations of time by applying image noise filtering to the computer-generated image, using the computer processor, based on analyzing the plurality of pixels, comprising:
identifying a pixel, in the computer generated image, corresponding to an isolated instance, in the scatter plot, based on analyzing a matrix of pixels surrounding the pixel in the computer generated image;
generating a candidate data set by removing the identified isolated instances of available durations of time and actual durations of time, comprising:
modifying the pixel in the computer generated image based on the analyzing the matrix of pixels surrounding the pixel in the computer generated image;
generating, using the computer processor, a mathematical function that fits the candidate data set;
identifying, using the computer processor, a first instance from the candidate data set with the shortest actual duration of time that is less than a threshold distance from a line defined by the mathematical function; and
assigning the actual duration of time for the identified first instance as a future duration of time for future operations of the at least one vehicle.

2. The method of claim 1, wherein the matrix of pixels surrounding the pixel comprises one or more of a 3×3 matrix, a 5×5 matrix, or a 7×7 matrix, and wherein the analyzing the matrix of pixels surrounding the pixel in the computer generated image comprises determining that every pixel in the matrix of pixels differs from the pixel in white or black value.

3. The method of claim 2, wherein applying image noise filtering further comprises removing instances of past operations that include isolated instances of available durations of time and actual durations of time that are more than an isolation distance from a symmetry line on the image of the scatter plot.

4. The method of claim 1, wherein generating a mathematical function that fits the candidate data set comprises applying linear regression to the candidate data set.

5. The method of claim 1, wherein generating a mathematical function that fits the candidate data set comprises applying a Hough transform to the candidate data set.

6. The method of claim 1, further comprising scheduling future operations of the at least one vehicle based on the future duration of time for the aspect of the operation.

7. The method of claim 6, further comprising operating the at least one vehicle based on the available future duration of time.

8. The method of claim 1, wherein the at least one vehicle is a fleet of aircraft, and wherein the aspect of the past operations is turn time.

9. The method of claim 1, wherein the at least one vehicle is a fleet of aircraft, and wherein the aspect of the vehicle operations is a maintenance service.

10. The method of claim 1, wherein the at least one vehicle is a train, and wherein the aspect of the vehicle operations is a station stop duration.

11. The method of claim 1, wherein the at least one vehicle is a ship, and wherein the aspect of the vehicle operations is a time in port.

12. The method of claim 1, wherein the received electronic data has been filtered to remove data related to past instance of operations in which a crew operating the vehicle has changed.

13. The method of claim 1, further comprising processing the received electronic data to remove data related to past instance of operations in which a crew operating the vehicle has changed.

14. A system, comprising:
a computer processor; and
a computer memory in communication with the computer processor, the computer memory storing:
electronic data related to instances of past operations of at least one vehicle, wherein the data comprises respective available durations of time and actual durations of time for an aspect of the past operations; and
an application, executable on the computer processor, to:
generate a scatter plot of the available durations of time for an aspect of the vehicle operation versus actual duration of time for the aspect for the instances;
convert the scatter plot to a computer-generated image, using the computer processor, such that locations of a plurality of pixels in the computer-generated image correspond with coordinates in the scatter plot;
identify isolated instances of available durations of time and actual durations of time by applying image noise filtering to the computer-generated image, using the computer processor, based on analyzing the plurality of pixels, comprising:
identifying a pixel, in the computer generated image, corresponding to an isolated instance, in the scatter plot, based on analyzing a matrix of pixels surrounding the pixel in the computer generated image;
generate a candidate data set by removing the identified isolated instances of available durations of time and actual durations of time, comprising:
modifying the pixel in the computer generated image based on the analyzing the matrix of pixels surrounding the pixel in the computer generated image;
generate a mathematical function that fits the candidate data set;
identify a first instance from the candidate data set with the shortest actual duration of time that is less than a threshold distance from a line defined by the mathematical function; and
assign the actual duration of time for the identified first instance as an available duration of time for future operations of the at least one vehicle.

15. A non-transitory computer program product for calculating a duration of time, the computer program product comprising a computer-readable medium having program instructions embodied therewith, the program instructions executable by a computer processor to perform an operation comprising:

receiving electronic data related to instances of past operations of at least one vehicle, wherein the data comprises respective available durations of time and actual durations of time for an aspect of the past operations;

generating a scatter plot of the available durations of time for an aspect of the vehicle operation versus actual duration of time for the aspect for the instances;

converting the scatter plot to a computer-generated image such that locations of a plurality of pixels in the computer-generated image correspond with coordinates in the scatter plot;

identifying isolated instances of available durations of time and actual durations of time by applying image noise filtering to the computer-generated image based on analyzing the plurality of pixels, comprising:

identifying a pixel, in the computer generated image, corresponding to an isolated instance, in the scatter plot, based on analyzing a matrix of pixels surrounding the pixel in the computer generated image;

generating a candidate data set by removing the identified isolated instances of available durations of time and actual durations of time, comprising:

modifying the pixel in the computer generated image based on the analyzing the matrix of pixels surrounding the pixel in the computer generated image;

generating a mathematical function that fits the candidate data set;

identifying a first instance from the candidate data set with the shortest actual duration of time that is less than a threshold distance from a line defined by the mathematical function; and assigning the actual duration of time for the identified first instance as a future duration of time for future operations of the at least one vehicle.

16. The computer program product of claim 15, wherein the received electronic data has been filtered to remove data related to past instance of operations in which a crew operating the vehicle has changed.

17. The computer program product of claim 15, wherein the operation further comprises processing the received electronic data to remove data related to past instance of operations in which a crew operating the vehicle has changed.

* * * * *